United States Patent
Kim (10) Patent No.: US 8,243,206 B2
(45) Date of Patent: Aug. 14, 2012

(54) METHOD AND APPARATUS FOR SELECTING CHANNEL BETWEEN DUPLICATE SERVICE CHANNELS AT DIGITAL BROADCASTING RECEIVER

(75) Inventor: Ki-Young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 12/617,137

(22) Filed: Nov. 12, 2009

(65) Prior Publication Data

US 2010/0118197 A1 May 13, 2010

(30) Foreign Application Priority Data

Nov. 13, 2008 (KR) ........................ 10-2008-0112979

(51) Int. Cl.
*H04N 5/50* (2006.01)
(52) U.S. Cl. .......................... 348/731; 348/732; 348/570
(58) Field of Classification Search .................. 348/570, 348/731–733, 725; 455/161.1, 166.1, 166.2, 455/173.1, 179.1, 182.3, 192.3; 725/56, 725/57, 59; *H04N 5/50, 5/44*
See application file for complete search history.

(56) References Cited

U.S. PATENT DOCUMENTS

| 5,416,508 A * | 5/1995 | Sakuma et al. ............... 348/570 |
| 7,227,583 B2 * | 6/2007 | Sin ................................. 348/731 |
| 2005/0102700 A1 * | 5/2005 | Cormack et al. .............. 348/731 |

* cited by examiner

*Primary Examiner* — Sherrie Hsia (74) *Attorney, Agent, or Firm* — Jefferson IP Law, LLP (57) ABSTRACT

A method and an apparatus for selecting a channel at a digital broadcasting receiver when duplicate channel services are found are provided. A method for generating a channel list at a digital broadcasting receiver includes scanning a plurality of broadcast channels, determining whether there exist one or more channels of the same broadcast service among the scanned broadcast channels, and linking the channels of the same broadcast service based on a priority. A method for selecting for a channel at a digital broadcasting receiver includes, when receiving weak broadcast signal while tuning to a first broadcast channel and receiving a broadcast signal, determining whether the first broadcast channel is linked to one or more other broadcast channels, selecting a second broadcast channel of a greater signal strength among the one or more other broadcast channels linked to the first broadcast channel, and tuning to the second broadcast channel and receiving the broadcast signal.

16 Claims, 6 Drawing Sheets

METHOD AND APPARATUS FOR SELECTING CHANNEL BETWEEN DUPLICATE SERVICE CHANNELS AT DIGITAL BROADCASTING RECEIVER

PRIORITY

This application claims the benefit under 35 U.S.C. §119(a) of a Korean patent application filed in the Korean Intellectual Property Office on Nov. 13, 2008, and assigned Serial No. 10-2008-0112979, the entire disclosure of which is hereby incorporated by reference.

BACKGROUND OF THE INVENTION

1. Field of the Invention

The present invention relates to a digital broadcasting receiver. More particularly, the present invention relates to a method and an apparatus for selecting a channel when the digital broadcasting receiver finds channels of the same service.

2. Description of the Related Art

A digital broadcasting service can provide users with not only four or five times more vivid image quality than the conventional analog broadcasting service but also various data information in real time. Naturally, public channels and various service providers offer diverse services and the number of digital broadcasting channels is gradually increasing. With the increase in digital broadcasting channels, when a digital broadcasting receiver scans channels, a method for accurately searching for the channels within a short period of time is desired.

Meanwhile, different broadcasting channels are allocated and serviced on the regional basis. For example, channels 1 through 3 are serviced in region A and channels 4 through 8 are serviced in region B. However, while the broadcasting channels differ per region, the same broadcast can be provided in the different resigns. That is, region A broadcasts TV series in channel 1 and region B broadcasts the same TV series as in region A, in channel 8.

As such, the Local Channel Number (LCN) cannot be an identifier for uniquely identifying the broadcasting service. The same service can be identified with a service ID and an original network ID of the broadcasting service. The broadcasting service refers to the service broadcast and received in the corresponding broadcast channel. The service ID is the ID of the broadcast program and every program has its unique ID information.

Figure 1:
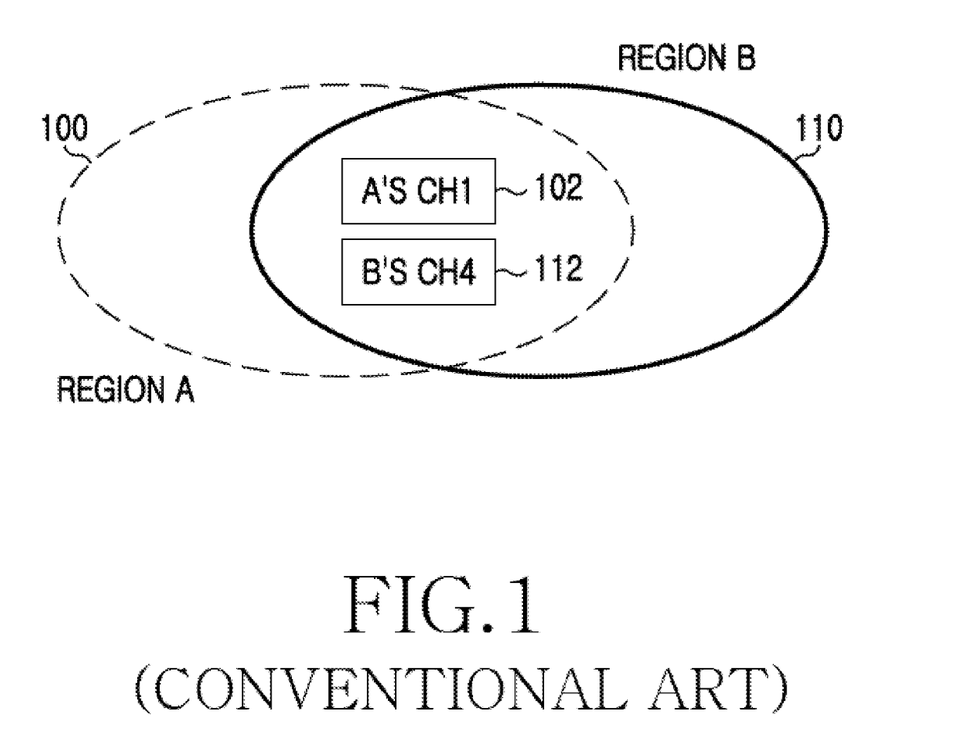
FIG. 1 illustrates a diagram of same broadcasting service in an overlapping area according to the conventional art.

FIG. 1 illustrates a diagram of same broadcasting service in an overlapping area according to the conventional art.

Referring to FIG. 1, a digital broadcasting receiver may search for channel 1 (102) of region A and channel 4 (112) of region B in the overlapping area of region A (100) and region B (110). When the service ID of the found channel 1 is the same as the service ID of the found channel 4, the digital broadcasting receiver generates a channel list by selecting either channel 1 or channel 4 of the same service and the unselected channel is not recorded in the channel list.

When channel 1 (102) and channel 4 (112) of the same service are found, the conventional method for selecting the channel is as follows.

First, as scanning broadcast channels, the digital broadcasting receiver stores a corresponding broadcast channel and signal strength information.

Next, the digital broadcasting receiver determines whether there exists the same service by checking the channel information (e.g., service ID) when the service search is completed. When detecting channels of the duplicate service, the digital broadcasting receiver generates the channel list by selecting the broadcast channel of the greater signal strength and excludes the unselected channels from the channel list. Thus, the user can select and view the corresponding broadcast service using the channel list.

Figure 2:
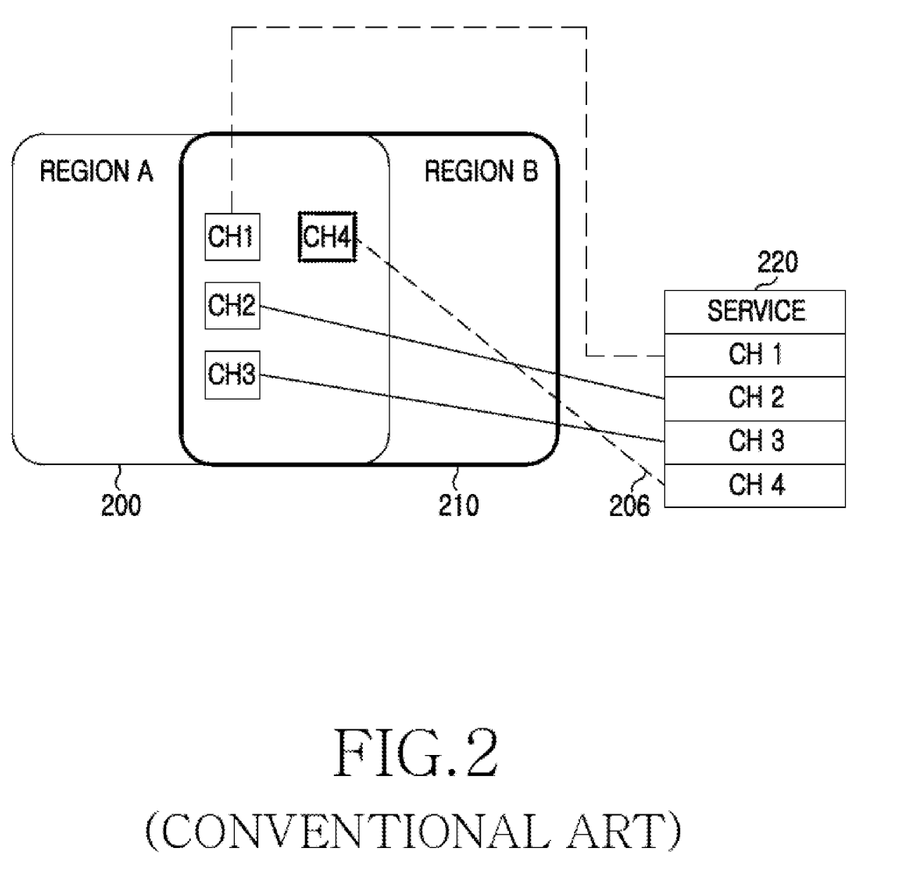
FIG. 2 illustrates a diagram of same service channel selection in an overlapping area according to the conventional art.

FIG. 2 illustrates a diagram of same service channel selection in an overlapping area according to conventional art.

Referring to FIG. 2, channel 1, channel 2 and channel 3 of region A (200) and channel 4 of region B (210) may be found and corresponding signal strength information of each channel is stored. When channel 1 through channel 4 are found in the overlapping area, the same broadcast service is provided from channel 1 of region A (200) and channel 4 of region B (210), and the signal strength of channel 1 is greater than that of channel 4, the channel list 220 includes only channel 1, channel 2, and channel 3. Channel 4 is excluded from the channel list 220 as indicated by 206.

When the broadcast is interrupted because of the weak broadcast signal while the user is watching the broadcast in the found channel 1, the user cannot return to the previously found channel 4 of the same service and view the same broadcast (because channel 4 is excluded from the channel list). In this situation, the user has to wait until the broadcast signal is received in channel 1, or to re-search for channel 1 or channel 4 through the channel scanning.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for selecting a channel at a digital broadcasting receiver when the duplicate channel services are found.

Another aspect of the present invention is to provide a method and an apparatus for connecting duplicate channels of the same service and viewing the broadcast at a digital broadcasting receiver by changing to another channel when the broadcast is interrupted.

In accordance with an aspect of the present invention, a method for generating a channel list at a digital broadcasting receiver is provided. The method includes scanning, by a controller, a plurality of broadcast channels, determining whether there exist one or more channels of the same broadcast service among the scanned broadcast channels, and linking, by a linkage channel constitutor, the one or more channels of the same broadcast service based on a priority.

In accordance with another aspect of the present invention, a method for selecting a channel at a digital broadcasting receiver is provided. A method includes selecting, by a channel selector, a first broadcast channel in a channel list, determining whether the first broadcast channel is linked to one or more other broadcast channels, and tuning to a channel of the greatest signal strength among the one or more other broadcast channels linked to the first broadcast channel.

In accordance with yet another aspect of the present invention, a method for selecting a channel at a digital broadcasting receiver is provided. The method includes, when receiving no broadcast signal while tuning to a first broadcast channel, determining whether the first broadcast channel is linked to one or more other broadcast channels, selecting a second broadcast channel of the greatest signal strength among the one or more other broadcast channels linked to the first broadcast channel, and tuning to the second broadcast channel and receiving the broadcast signal.

In accordance with still another aspect of the present invention, an apparatus for generating a channel list at a digital broadcasting receiver is provided. The apparatus includes a controller for scanning a plurality of broadcast channels and for determining whether there exist one or more channels of the same broadcast service among the scanned broadcast channels, and a linkage channel constitutor for linking the one of more channels of the same broadcast service based on a priority.

In accordance with a further aspect of the present invention, an apparatus for selecting a channel at a digital broadcasting receiver is provided. The apparatus includes a channel selector for selecting a first broadcast channel in a channel list, a linkage channel constitutor for determining whether the first broadcast channel is linked to one or more other broadcast channels, and a tuner for tuning to a channel of the greatest signal strength among the one or more other broadcast channels linked to the first broadcast channel.

In accordance with a further aspect of the present invention, an apparatus for selecting a channel at a digital broadcasting receiver is provided. The apparatus includes a linkage channel constitutor for, when receiving no broadcast signal while tuning to a first broadcast channel, determining whether the first broadcast channel is linked to one or more other broadcast channels, a channel selector for selecting a second broadcast channel of a greater signal strength among the one or more other broadcast channels linked to the first broadcast channel, and a tuner for tuning to the second broadcast channel and receiving the broadcast signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments the present invention will become more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for selecting a channel at a digital broadcasting receiver when channels of the same services are found.

Figure 3:
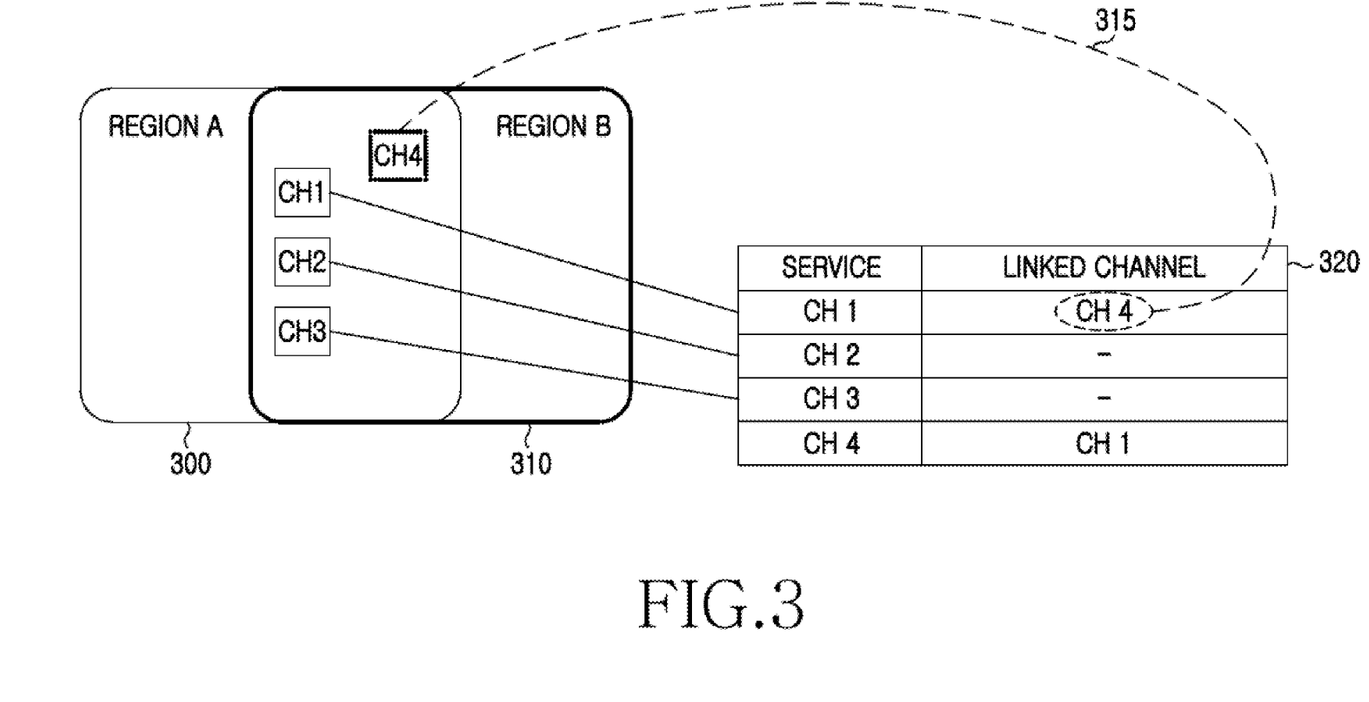
FIG. 3 illustrates a diagram of a same service channel selection in an overlapping area when channels of the same services are found according to an exemplary embodiment of the present invention.

FIG. 3 illustrates a diagram of a same service channel selection in an overlapping area when channels of the same services are found according to an exemplary embodiment of the present invention.

Referring to FIG. 3, a digital broadcasting receiver in the overlapping area between region A (300) and region B (310) scans channels and finds channel 1, channel 2, and channel 3 of region A (300) and channel 4 of region B (310). The digital broadcasting receiver determines whether there exists the same service by comparing channel information (e.g., service ID) received in the channel scanning. When the service IDs of channel 1 and channel 4 are the same, the digital broadcasting receiver links channel 1 and channel 4, which is referred to as a linkage service. More specifically, the digital broadcasting receiver generates a channel list (e.g., channel 1 through channel 4) through the channel scanning, checks for the same service ID in the found channels, and links the duplicate channels. For example, when channel 1 and channel 4 use the same service ID, the digital broadcasting receiver links channel 1 and channel 4 in step 315. The conventional receiver compares signal strength of channel 1 and channel 4, includes only a selected channel to the channel list, and excludes the unselected channel from the channel list.

When the channel list 320 is generated, every broadcast channel found in the channel scanning is recorded and the channels of the same service ID are linked. Hence, when a user selects one broadcast channel, the digital broadcasting receiver tunes to the channel of the better signal among the same services. When the broadcast reception is infeasible because of the weak broadcast signal, the digital broadcasting receiver tunes to the other channel linked to the corresponding channel, thus maintaining the same service without interruption.

Figure 4:
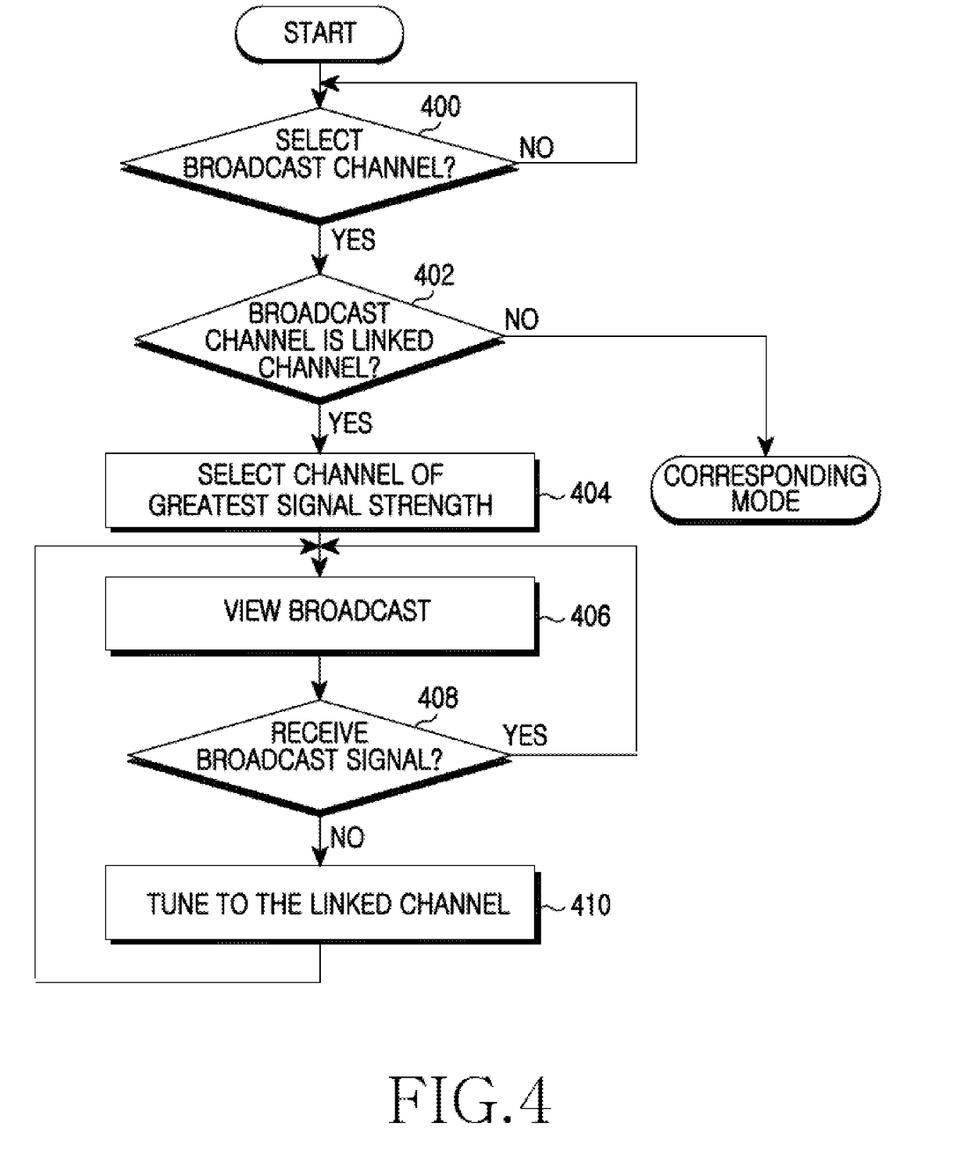
FIG. 4 illustrates a flowchart for selecting a channel at a digital broadcasting receiver when channels of the same services are found according to an exemplary embodiment of the present invention.

FIG. 4 illustrates a flowchart for selecting a channel at a digital broadcasting receiver when channels of the same services are found according to an exemplary embodiment of the present invention.

Referring to FIG. 4, when a user selects a broadcast channel in step 400, the digital broadcasting receiver determines whether the selected broadcast channel is a linked broadcasting channel in step 402. That is, the digital broadcasting receiver determines whether the selected broadcast channel is linked to at least one another channel of the same service.

If it is determined that the selected broadcast channel is a linked broadcasting channel in step 402, the digital broadcasting receiver selects the channel of the greatest signal strength from the linked channels for the same service in step 404. In contrast, if it is determined that the selected broadcast channel is not a linked broadcasting channel in step 402 (when there is no other channel linked for the same service), the digital broadcasting receiver performs the corresponding mode operation. For example, in the corresponding mode, the digital broadcasting receiver tunes to the broadcast channel selected in step 400 and receives the broadcast signal.

In step 406, the digital broadcasting receiver tunes to the selected channel of the greatest signal strength (herein, referred to as a first broadcast channel) and receives the broadcast signal.

In step 408, the digital broadcasting receiver determines that the broadcasting signal is received. If it is determined that the broadcast signal is not received because the broadcast signal is weak in the first broadcast channel in step 408, the digital broadcasting receiver tunes to the other channel of the same service and receives the broadcast signal in step 410. In contrast, if it is determined that the broadcast signal is received in step 408, the digital broadcasting receiver continues receiving the broadcast signal in the first broadcast channel.

Next, the digital broadcasting receiver finishes this process.

As stated above, after the channel list 320 of FIG. 3 is generated, when the broadcast signal of channel 1 is not received because the signal strength is weak while receiving the broadcasting service in channel 1, the digital broadcasting receiver receives the broadcast signal of the same service by tuning to channel 4 (315) linked to channel 1. Thus, when the broadcast is not received in a channel, the broadcast can be viewed by tuning to another channel of the same service.

Figure 5:
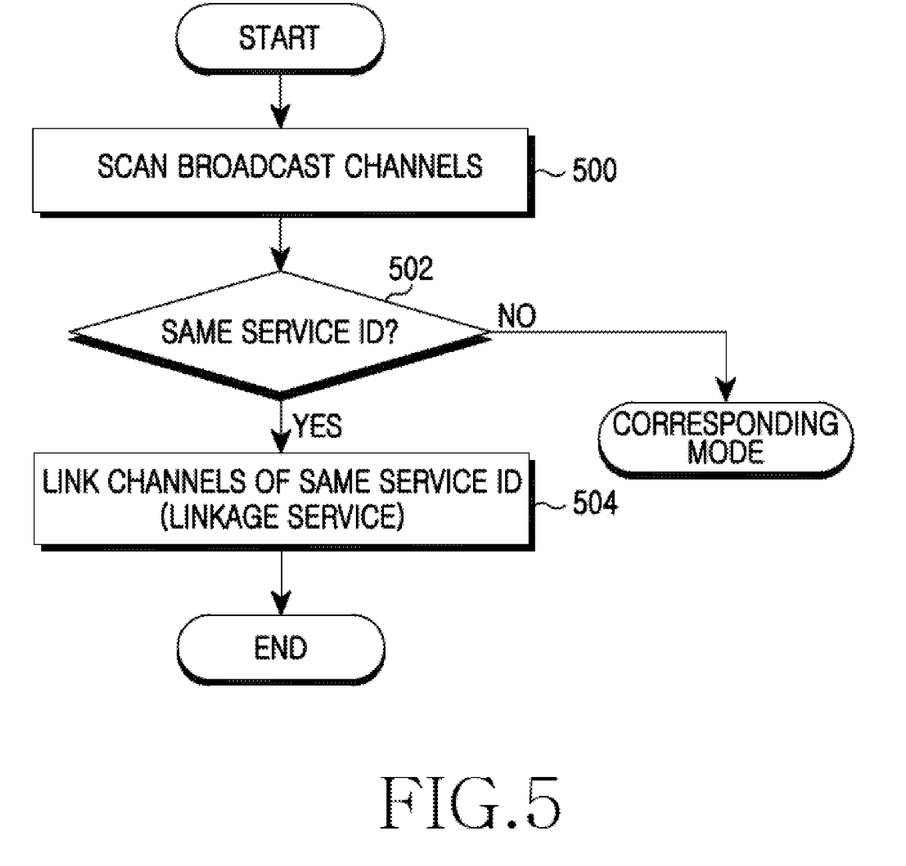
FIG. 5 illustrates a flowchart for generating a channel list including a linked broadcasting channel at a digital broadcasting receiver according to an exemplary embodiment of the present invention.

FIG. 5 illustrates a flowchart for generating a channel list including a linked broadcasting channel at a digital broadcasting receiver according to an exemplary embodiment of the present invention.

A digital broadcasting receiver scans broadcast channels in step 500 and determines whether one or more channels for the same service among the scanned broadcast channels are detected in step 502. That is, the digital broadcasting receiver compares the service ID information of each scanned broadcast channel and finds the channels of the same service ID.

If it is determined that the one or more channels of the same service are detected in step 502, the digital broadcasting receiver links the channels of the same service according to their signal strength in step 504. In contrast, when detecting no other channel of the same service in step 502, the digital broadcasting receiver performs the corresponding mode operation.

Next, the digital broadcasting receiver finishes this process.

Figure 6:
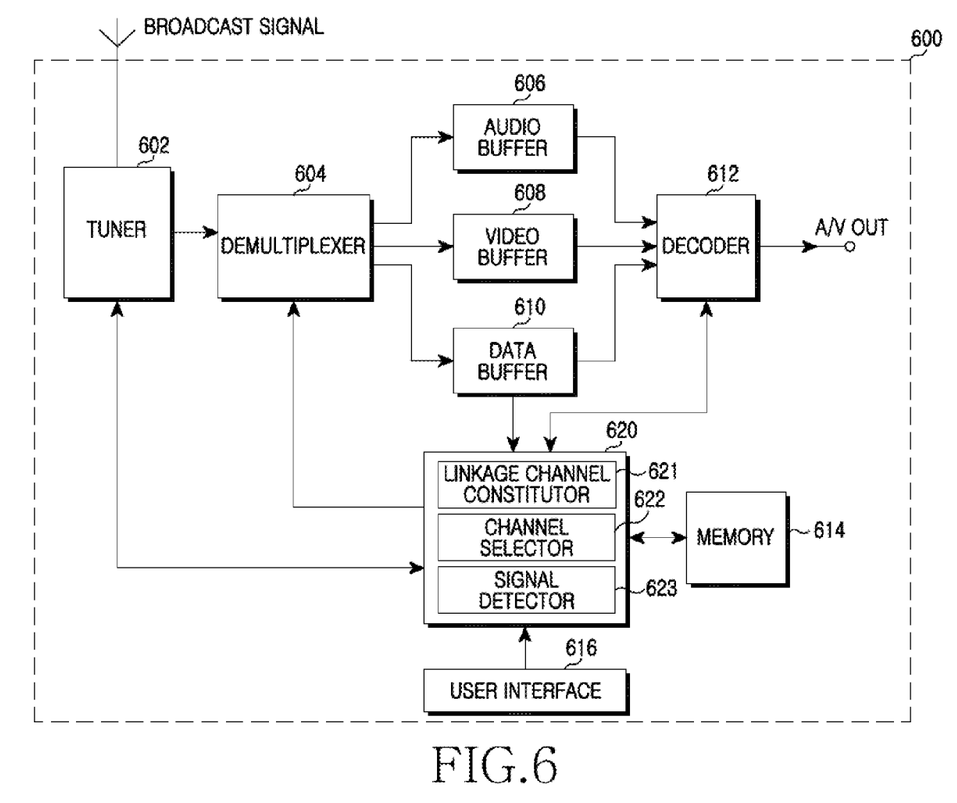
FIG. 6 illustrates a block diagram for selecting a channel at a digital broadcasting receiver when channels of the same services are found according to an exemplary embodiment of the present invention.

FIG. 6 illustrates a block diagram for selecting a channel at a digital broadcasting receiver when channels of the same services are found according to an exemplary embodiment of the present invention.

Referring to FIG. 6, A digital broadcasting receiver 600 includes a tuner 602 for receiving the broadcast signal, a demultiplexer 604 for splitting the transport stream of a broadcast program received through the tuner 602 into audio, video and data, an audio buffer 606 for temporarily storing the audio output from the demultiplexer 604, a video buffer 608 for temporarily storing the video output from the demultiplexer 604, a data buffer 610 for temporarily storing the data output from the demultiplexer 604, a decoder 612 for decoding the signals of the buffers 606, 608 and 610, and a memory 614 for storing various data and a program required for the operations of the digital broadcasting receiver 600.

The memory 614 contains an operating program for the channel scanning of the digital broadcasting receiver 600, and various data required for the execution of the operating program. For example, after the channel scanning, the memory 614 stores the channel list which links the channels of the same service.

The tuner 602 tunes to a broadcast channel desired by the user among the digital broadcast signals received via a broadcast antenna or a cable. For doing so, when the user selects his/her intended broadcast channel through a user interface 616, a controller 620 reads out the information corresponding to the selected broadcast channel from the memory 614 and provides the channel information to the tuner 602.

The digital broadcasting receiver 600 includes the controller 620 for controlling the digital broadcasting receiver 600, for example, for receiving the digital broadcast program through the tuner 602, recording a broadcast program, and reproducing a broadcast program stored to a hard disc (not shown).

The controller 620 reads out Service Information (SI) temporarily stored to the data buffer and uses the SI as reference information for the broadcast signal processing and the controlling. In this exemplary embodiment, the controller 620 generates the channel list which links the channels of the same service, and controls the channel selection when the channels of the same service are found. To this end, the controller 620 includes a linkage channel constitutor 621, a channel selector 622, and a signal detector 623.

The controller 620 compares the channel information (e.g., the service ID) received in the channel scanning, checks the channels of the same service, and provides the result to the linkage channel constitutor 621.

The linkage channel constitutor 621 receives the channel information of the same service, generates the channel list by linking the channels of the same service, and stores the channel list to the memory 614.

When the broadcast channel is selected through the user interface 616 and is linked with the same service channels, the channel selector 622 selects the channel of the greatest signal from the duplicate service channels and outputs this information to the tuner 602. When the broadcast signal is not received because of the weak signal strength in the broadcast channel, the channel selector 622 selects another channel of the same service and outputs this information to the tuner 602.

When the broadcast signal is not received because of the weak signal strength while receiving the broadcast signal in the corresponding channel, the signal detector 623 provides the result to the channel selector 622.

As set forth above, for the duplicate channels of the same service, the digital broadcasting receiver links the duplicate channels. Therefore, when the broadcasting in one of the linked channels is interrupted, the digital broadcasting receiver tunes to another linked channel so that the user can view the broadcast without interruption.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for generating a channel list at a digital broadcasting receiver, the method comprising:
   scanning, by a controller, a plurality of broadcast channels;
   determining whether there exist one or more channels of the same broadcast service among the scanned broadcast channels; and
   linking, by a linkage channel constitutor, the channels of the same broadcast service based on a priority.

2. The method of claim 1, wherein the priority is determined by signal strength of the scanned broadcast channels.

3. The method of claim 1, further comprising:
   storing the signal strength of each scanned broadcast channel; and
   arranging the scanned broadcast channels according to the signal strength.

4. The method of claim 1, wherein the determining of whether there exist the one or more channels of the same broadcast service is based on at least one of a service ID and a local network ID of the broadcast channel.

5. A method for selecting a channel at a digital broadcasting receiver, the method comprising:
   selecting, by a channel selector, a first broadcast channel in a channel list;
   determining whether the first broadcast channel is linked to one or more other broadcast channels; and
   tuning to a channel of the greatest signal strength among the one or more other broadcast channels linked to the first broadcast channel.

6. The method of claim 5, further comprising:
   informing, by a signal detector, the channel selector of weak signals, when a broadcast signal is not received because signal strength becomes weak while receiving the broadcast signal in the corresponding channel.

7. A method for selecting a channel at a digital broadcasting receiver, the method comprising:
   determining whether a first broadcast channel is linked to one or more other broadcast channels, when receiving no broadcast signal while tuning to the first broadcast channel;
   selecting a second broadcast channel of the greatest signal strength among the one or more other broadcast channels linked to the first broadcast channel; and
   tuning to the second broadcast channel and receiving the broadcast signal.

8. The method of claim 7, further comprising:
   when receiving no broadcast signal by tuning to the second broadcast channel, tuning to a next linked broadcast channel and receiving the broadcast signal.

9. An apparatus for generating a channel list at a digital broadcasting receiver, the apparatus comprising:
   a controller for scanning a plurality of broadcast channels and for determining whether there exist one or more channels of the same broadcast service among the scanned broadcast channels; and
   a linkage channel constitutor for linking the one or more channels of the same broadcast service based on a priority.

10. The apparatus of claim 9, wherein the priority is determined by signal strength of the scanned broadcast channels.

11. The apparatus of claim 9, wherein the controller stores the signal strength of each scanned broadcast channel, and arranges the scanned broadcast channels according to signal strength.

12. The apparatus of claim 9, wherein the linkage channel constitutor determines whether there exist the one or more channels of the same broadcast service based on at least one of a service ID and a local network ID of the broadcast channel.

13. An apparatus for selecting a channel at a digital broadcasting receiver, the apparatus comprising:
   a channel selector for selecting a first broadcast channel in a channel list;
   a linkage channel constitutor for determining whether the first broadcast channel is linked to one or more other broadcast channels; and
   a tuner for tuning to a channel of the greatest signal strength among the one or more other broadcast channels linked to the first broadcast channel.

14. The apparatus of claim 13, further comprising:
   a signal detector for informing the channel selector of weak signals, when a broadcast signal is not received because signal strength becomes weak while receiving the broadcast signal in the corresponding channel.

15. An apparatus for selecting a channel at a digital broadcasting receiver, an apparatus comprising:
   a linkage channel constitutor for, when receiving no broadcast signal while tuning to a first broadcast channel, determining whether the first broadcast channel is linked to one or more other broadcast channels;
   a channel selector for selecting a second broadcast channel of a greater signal strength among the one or more other broadcast channels linked to the first broadcast channel; and
   a tuner for tuning to the second broadcast channel and receiving the broadcast signal.

16. The apparatus of claim 15, wherein, when no broadcast signal is received by tuning to the second broadcast channel, the tuner tunes to a next linked broadcast channel and receives the broadcast signal.

* * * * *